United States Patent
Wang

(10) Patent No.: US 7,600,106 B2
(45) Date of Patent: Oct. 6, 2009

(54) SYSTEM AND METHOD FOR ENABLING/DISABLING WRITE-PROTECTION OF A BASIC INPUT OUTPUT SYSTEM

(75) Inventor: Fei-Zhou Wang, Guangdong (CN)

(73) Assignees: Hong Fu Jin Precision Industry (Shen Zhen) Co., Ltd., Longhua Town, Bao'an District, Shenzhen, Guangdond Province (CN); Hon Hai Precision Industry Co., Ltd., Tu-Cheng, Taipe Hsien (TW)

( * ) Notice: Subject to any disclaimer, the term of this patent is extended or adjusted under 35 U.S.C. 154(b) by 541 days.

(21) Appl. No.: 11/309,458

(22) Filed: Aug. 10, 2006

(65) Prior Publication Data

US 2007/0079094 A1    Apr. 5, 2007

(30) Foreign Application Priority Data

Sep. 30, 2005    (CN)    .................... 2005 1 0100110

(51) Int. Cl.
G06F 15/177    (2006.01)

(52) U.S. Cl. ................. 713/1; 713/2; 713/100

(58) Field of Classification Search .................... 713/1, 713/2, 100

See application file for complete search history.

(56) References Cited

U.S. PATENT DOCUMENTS

| | | | |
|---|---|---|---|
| 6,026,016 A * | 2/2000 | Gafken | 365/185.04 |
| 6,243,809 B1 * | 6/2001 | Gibbons et al. | 713/1 |
| 6,591,366 B1 * | 7/2003 | Munker et al. | 726/28 |
| 6,829,672 B1 | 12/2004 | Deng et al. | |
| 6,986,035 B2 * | 1/2006 | Stevens et al. | 713/2 |
| 2005/0144613 A1 * | 6/2005 | Tseng | 717/168 |

* cited by examiner

*Primary Examiner*—Dennis M Butler
(74) *Attorney, Agent, or Firm*—Winston Hsu

(57) ABSTRACT

A method for enabling/disabling write-protect of a basic input/output system (BIOS) includes: setting a parameter structure; configuring a pointer of a header file and a data structure of the header file in a program segment of the BIOS codes; configuring data blocks that are configured for enabling/disabling the write-protection of the BIOS for the data structure in the program segment; searching the pointer of the header file, and locating the data blocks; and processing codes in a data block that is corresponding to a command line sub-parameter of the parameter structure. A system for enabling/disabling write-protect of a basic input/output system (BIOS) is also disclosed.

5 Claims, 5 Drawing Sheets

SYSTEM AND METHOD FOR ENABLING/DISABLING WRITE-PROTECTION OF A BASIC INPUT OUTPUT SYSTEM

FIELD OF THE INVENTION

The present invention generally relates to systems and methods for controlling a write-protection of computer systems, and more particularly to a system and method for enabling/disabling write-protection of a basic input output system (BIOS).

DESCRIPTION OF RELATED ART

Computers are usually initialized by executing a basic input output system (BIOS). A BIOS of a personal computer (PC) contains all codes required to perform a self-test and to control a keyboard, a display screen, disk drives, serial communications, and a number of miscellaneous functions. The BIOS then loads the operating system from a disk. Originally, the BIOS is burnt onto a read-only memory (ROM) and cannot be changed unless physically replacing the ROM. As the functions performed by the BIOS become more complex, and computers became easier to reconfigure after manufacture, the BIOS is burnt in rewritable and programmable ROM, such as flash memory.

Since the BIOS can now be rewritten in the flash memory, it is common to enable a write-protection function of the BIOS in order to prevent the BIOS from being accidentally or purposely destroyed.

As such, if a BIOS configuration of a computer configuration is not compatible, a write-protection of the BIOS must be disabled to burn a new compatible BIOS configuration. There are many different software to disable the write-protection of the BIOS corresponding to different computer configurations, yet there is not a uniform method to disable write-protection of the BIOS. In other words, a new computer configuration always requires providing a new software to disable write-protection of the BIOS.

What is needed, therefore, is a system and method that can be utilized to enable/disable write-protection of a BIOS uniformly and safely.

SUMMARY OF INVENTION

A system for enabling/disabling write-protection of a basic input/output system (BIOS) in accordance with a preferred embodiment includes a setting module, a searching module, an input/output module, and a processing module. The setting module is configured for setting a parameter structure, configuring a pointer of a header file and a data structure of the header file in a particular segment of the BIOS codes, and configuring data blocks that are configured for enabling/disabling the write-protection of the BIOS for the data structure in the particular segment. The searching module is configured for searching the pointer of the header file, locating the data blocks, and returning an offset address of a byte. The input/output module is configured for inputting a command line sub-parameter of the parameter structure, and returning a message that indicates the write-protection of the BIOS is enabled or disabled. The processing module is configured for processing codes in a data block that is corresponding to the inputted command line sub-parameter.

A method for enabling/disabling write-protection of a basic input/output system (BIOS) in accordance with a preferred embodiment includes the steps of: setting a parameter structure; configuring a pointer of a header file and a data structure of the header file in a particular program segment of the BIOS codes; configuring data blocks that are used for enabling/disabling the write-protection of the BIOS for the data structure in the particular program segment; searching the pointer of the header file, and locating the data blocks; and processing codes in a data block that is corresponding to a command line sub-parameter of the parameter structure.

Other advantages and novel features of the present invention will become more apparent from the following detailed description of preferred embodiments when taken in conjunction with the accompanying drawings.

DETAILED DESCRIPTION

Figure 1:
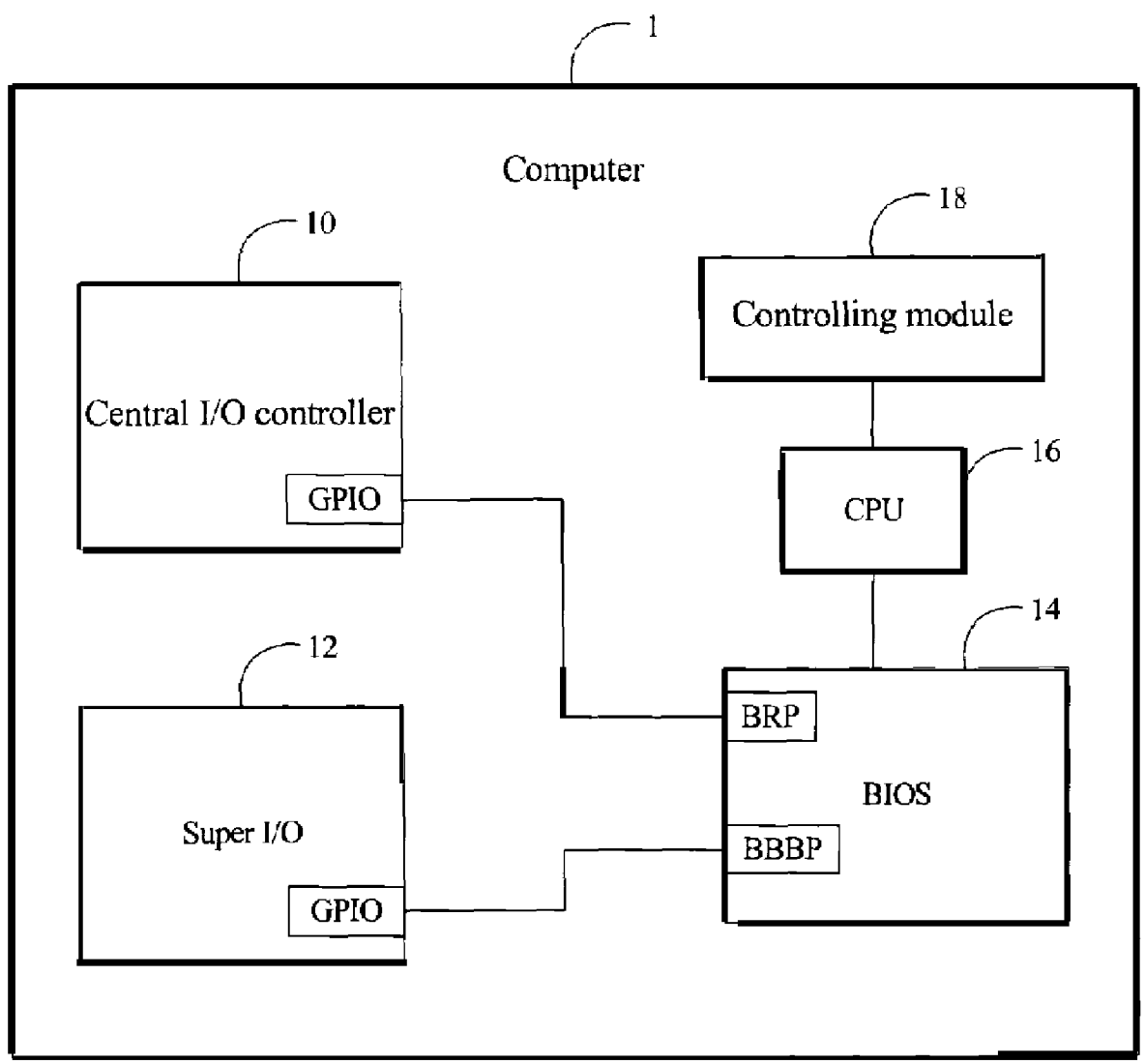
FIG. 1 is a schematic diagram of a hardware configuration of a system for enabling/disabling write-protection of a basic input/output system (BIOS) in accordance with a preferred embodiment.

FIG. 1 is a schematic diagram of a hardware configuration of a system for enabling/disabling write-protection of a basic input/output system (BIOS) (hereinafter, "the system") in accordance with a preferred embodiment. The system includes a computer 1. The computer 1 typically includes: a central processing unit (CPU) 16, a controlling module 18 connected with the CPU 16, a central I/O controller 10, a super I/O controller 12, and a BIOS 14 connected with the CPU 16, the central I/O controller 10, and the super I/O controller 12. The BIOS ROM protect (BRP) pin and BIOS boot block protect (BBBP) pin of the BIOS 14 are connected with a general purpose input/output (GPIO) pin of the central I/O controller 10 and a GPIO pin of the super I/O controller 12 respectively. In an alternative embodiment, the BRP pin and the BBBP pin of the BIOS 14 are connected with the GPIO pin of the super I/O controller 12 and the GPIO pin of the central I/O controller 10 respectively.

Figure 2:
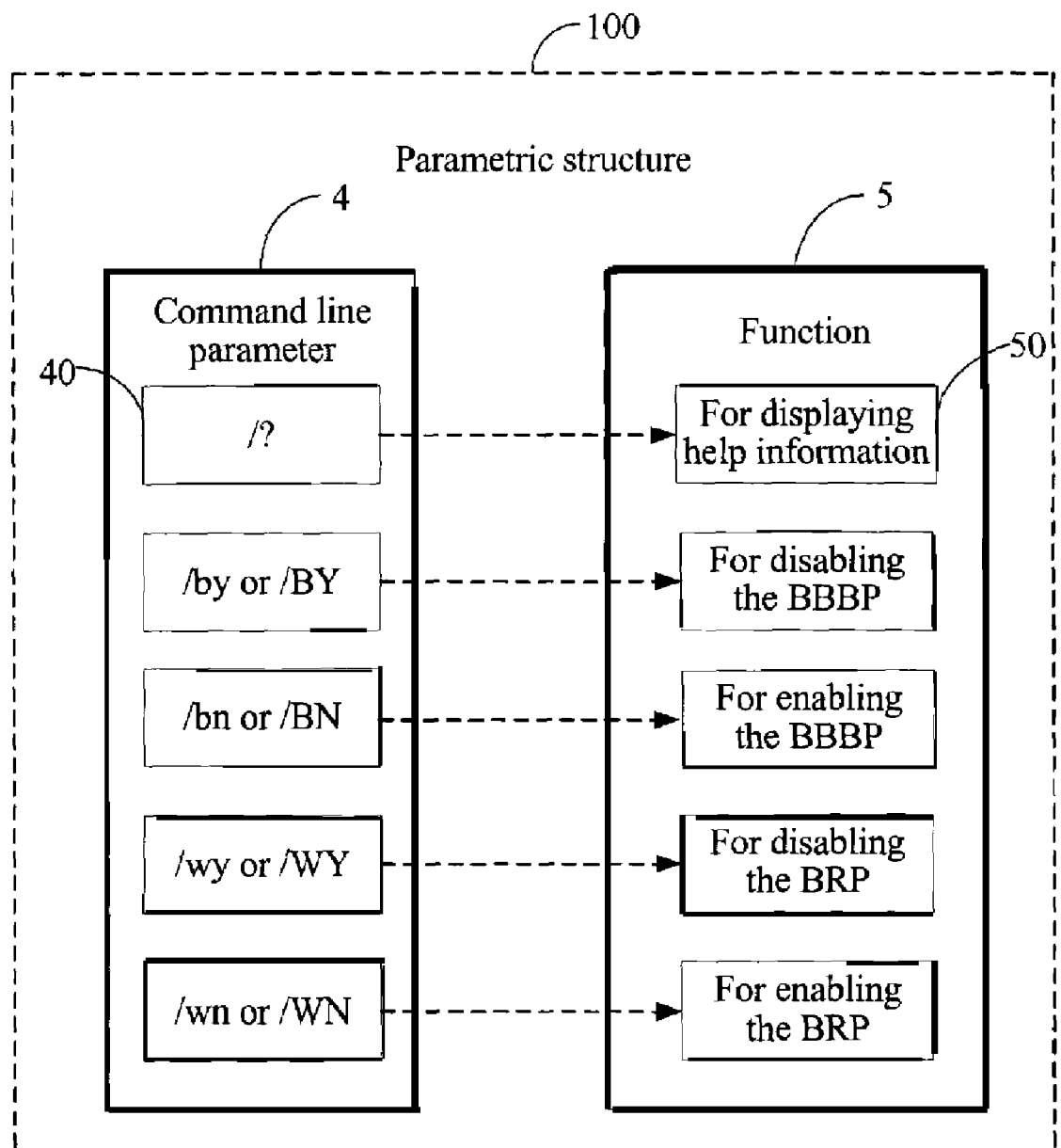
FIG. 2 is a schematic diagram of a parametric structure for command lines of the system of FIG. 1.

FIG. 2 is a schematic diagram of a parameter structure of the system. The parameter structure 100 typically includes a command line parameter 4 and a function 5. The command line parameter 4 typically includes many command line parameter options 40. The function 5 typically includes many option-functions 50 corresponding to the command line parameter options 40. In the preferred embodiment, each command line parameter option 40 solely corresponds to an option-function 50. For example, in the schematic diagram, the command line parameter option 40 "/?" set in the command line parameter 4 corresponds to the option-function 50 "for displaying help information". In alternative embodiments, the command line parameter option 40 "/?" can also be set with "/!" or any other suitable formation that corresponds to the option-function 50 "for displaying help information".

Figure 3:
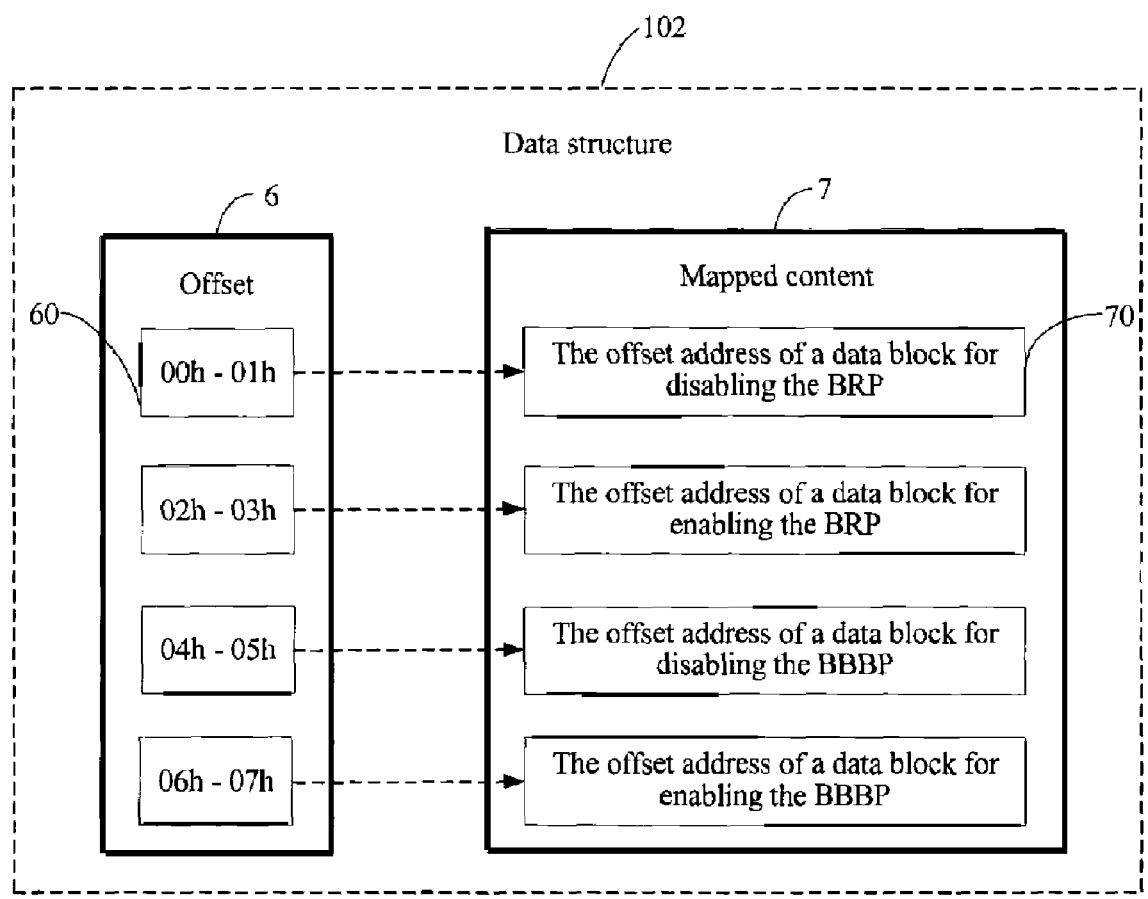
FIG. 3 is a schematic diagram of a data structure for a header file of the system of FIG.

FIG. 3 is a schematic diagram of a data structure for a header file of the system. The data structure 102 for the header file typically includes an offset 6 and a mapped content 7. The offset 6 typically includes many offset addresses 60. The mapped content 7 typically includes many representing mapped data 70 corresponding to the offset addresses 60. In the preferred embodiment, one offset address 60 solely corresponds to one mapped data 70. For an example in the schematic diagram, the offset address 60 "00h-01h" set in the offset 6 solely corresponds to the mapped data 70 "the offset address of a data block for disabling the BRP". In other preferred embodiments, the offset address 60 "00h-01h" can also be set with "00h-02h" or any other suitable formation that corresponds to the mapped data 70 "the offset address of a sub-program for disabling the BRP".

Figure 4:
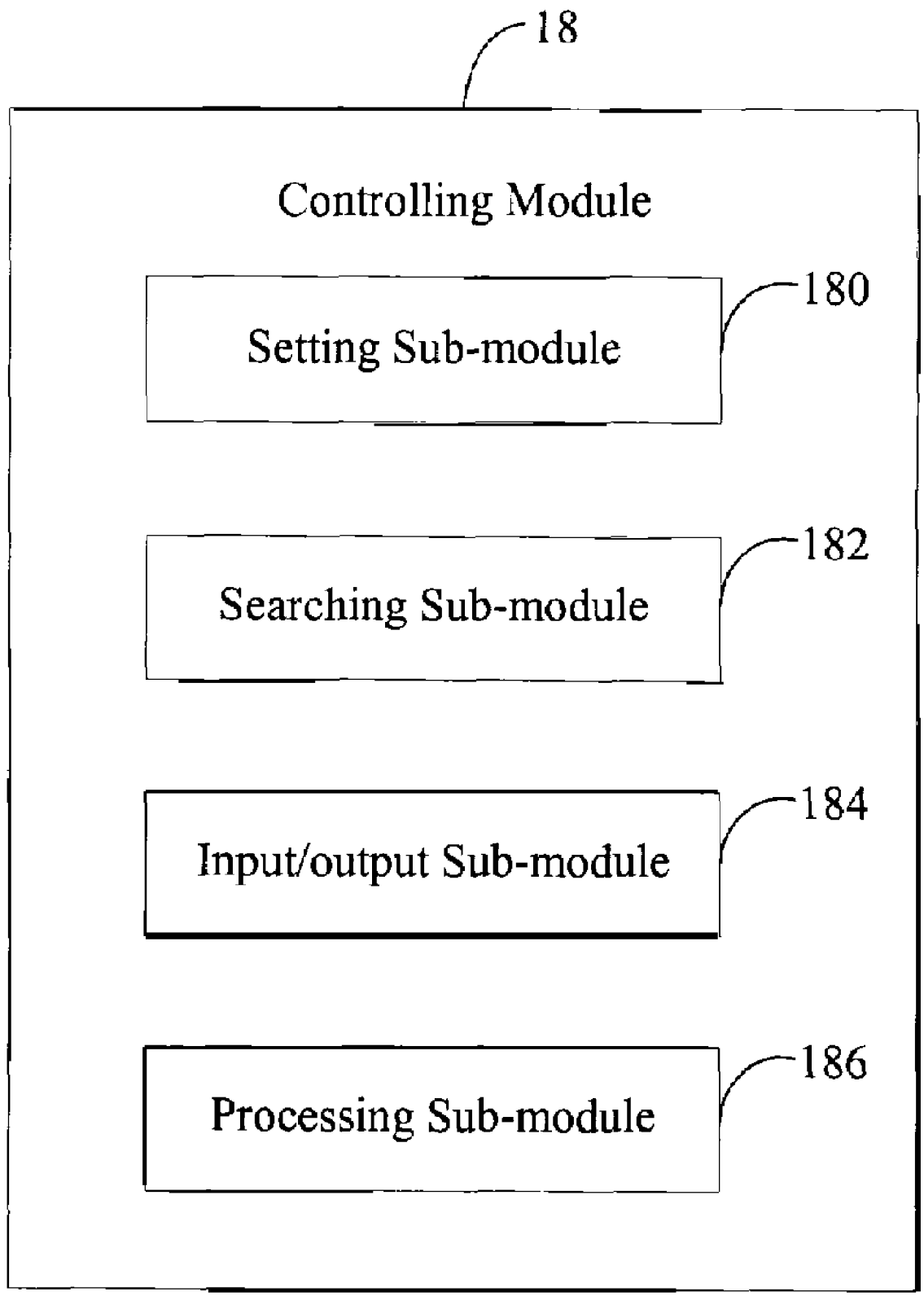
FIG. 4 is a schematic diagram of main function sub-modules of a controlling module of the system of FIG. 1.

FIG. 4 is a schematic diagram of main function sub-modules of the controlling module 18 of the system. The controlling module 18 typically includes a setting sub-module 180, a searching sub-module 182, an input/output sub-module 184, and a processing sub-module 186.

The setting sub-module 180 is configured for setting the parametric structure 100, configuring a pointer of a header file and the data structure 102 of the header file in the BIOS 14 "Runtime" segment, and configuring many corresponding data blocks for the mapped data 70. The corresponding data blocks are used for setting the GPIO pin of the central I/O controller 10 and GPIO pin of the super I/O controller 12 in a high level state or a low level state, and further used for enabling or disabling the write-protection of BIOS ROM or a BIOS Boot Block.

The searching sub-module 182 is configured for searching the pointer of the header file set by the setting sub-module 180, locating the data blocks set by the setting sub-module 180, and returning an offset address of a byte.

The input/output sub-module 184 is configured for prompting an input box—a user interface to input a command line parameter option 40. The input/output sub-module 184 is further configured for returning a message that indicates the write-protection of BIOS ROM or BIOS Boot Block is enabling or disabling.

The processing sub-module 186 is configured for processing codes in the data block that corresponds to the inputted command line parameter option 40.

Figure 5:
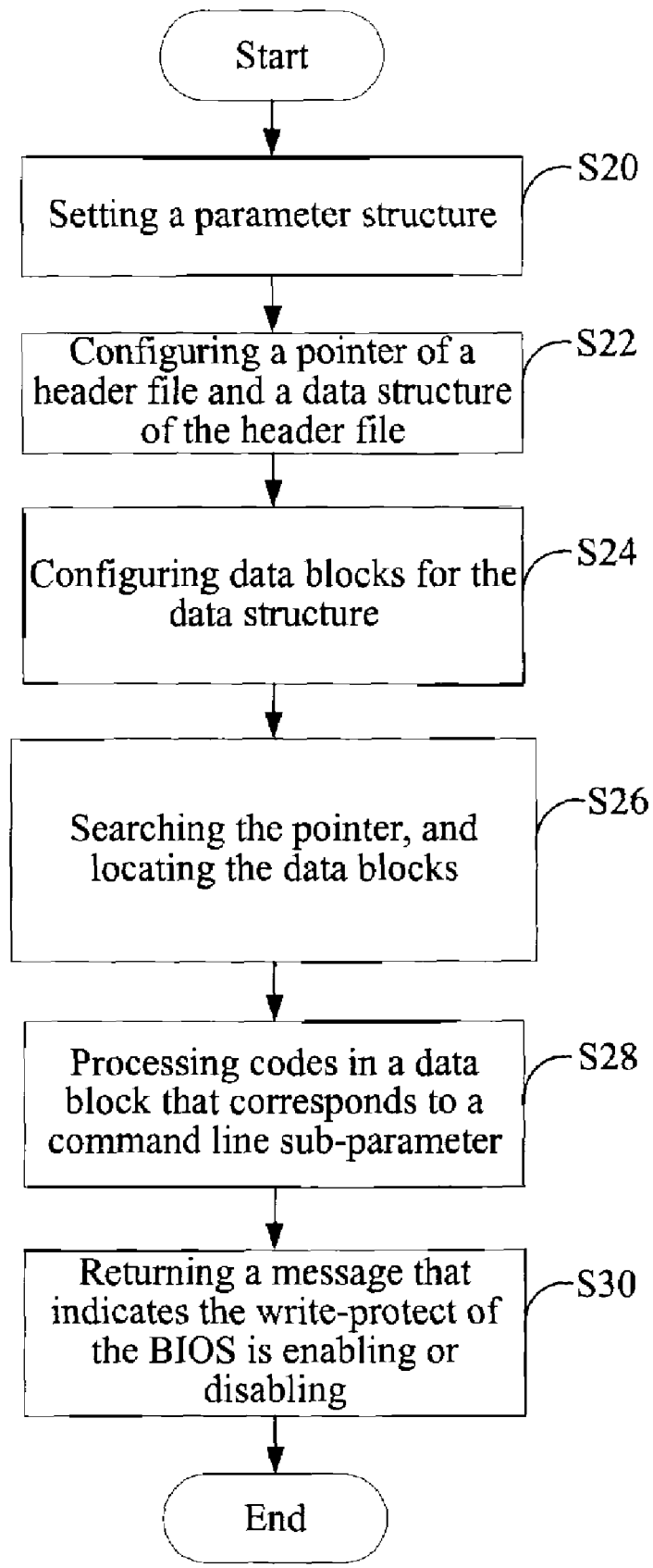
FIG. 5 is a flowchart of a method for enabling/disabling write-protection of a basic input/output system (BIOS) in accordance with a preferred embodiment.

FIG. 5 is a flowchart of a method for enabling/disabling write-protection of a basic input/output system (BIOS) in accordance with a preferred embodiment. In the preferred embodiment, the system may be used to enable/disable the write-protect of the BIOS 14 of the computer 1. In step S20, the central processing unit (CPU) 16 of the computer 1 activates the setting sub-module 180. The setting sub-module 180 sets the parametric structure 100. In step S22, the setting sub-module 180 configures a pointer (for example, "@levgon$") of the header file and the data structure 102 of the header file in the BIOS 14 "Runtime" segment. In step S24, the setting sub-module 180 configures many corresponding data blocks for the mapped data 70 that maps to the data structure 102 in the BIOS 14 "Runtime" segment. The configured data blocks are used for setting the GPIO pin of the central I/O controller 10 and GPIO pin of the super I/O controller 12 in the high level state or the low level state, and for enabling or disabling the write-protection of BIOS ROM or BIOS Boot Block. In step S26, the CPU 16 activates the searching sub-module 182. The searching sub-module 182 is configured for searching the pointer of the header file configured by the setting sub-module 180, locating the data blocks set by the setting sub-module 180, and returning the offset byte address. The byte is next to the last character (for example, the "$" in "@levgon$") of the header file pointer. In step S28, the CPU 16 activates the input/output sub-module 184 and the processing sub-module 186. The input/output sub-module 184 prompts an input box—the user interface to input a command line parameter option 40, the processing sub-module 186 processes codes in the data block that corresponds to the inputted command line parameter option 40.

In other words, the processing sub-module 186 selects a offset address 60 corresponding to the mapped content 70 that further corresponds to the command line parameter option 40 inputted by the user, adds the selected offset address 60 to the offset byte address returned by the searching sub-module 182 in order to get an address of a memory unit that stores the mapped data 70, obtains address of the data block that corresponds to the inputted command line parameter option 40, adds the obtained address of the data block to address of the BIOS 14 "Runtime" segment in order to get a full mapped address that is used to access the corresponding data block, puts the got full mapped address to the function pointer variable, and calls the codes in the data block via the function pointer variable.

In step S30, the input/output sub-module 184 returns a message corresponding to the inputted command line parameter option 40. In other words, the returned message indicates the write-protect of BIOS ROM is disabling if the inputted command line parameter option 40 is to disable the write-protect of BIOS ROM.

Although the present invention has been specifically described on the basis of a preferred embodiment and a preferred method, the invention is not to be construed as being limited thereto. Various changes or modifications may be made to said embodiment and method without departing from the scope and spirit of the invention.

What is claimed is:

1. A system for enabling/disabling write-protection of a basic input/output system (BIOS) of a computer, the computer comprising a central I/O controller and a super I/O controller, the system comprising:

a setting module configured for setting a parameter structure, configuring a pointer of a header file and a data structure of the header file in a particular segment of the BIOS codes, and configuring data blocks for the data structure in the particular segment, the data blocks used to set a general purpose input/output (GPIO) pin of the central I/O controller and a GPIO pin of the super I/O controller in a high level state or a low level state, to enable/disable the write-protection of the BIOS;

a searching module configured for searching the pointer of the header file, locating the data blocks, and returning an offset address of a byte;

an input/output module configured for inputting a command line sub-parameter of the parameter structure, and returning a message that indicates the write-protection of the BIOS is enabled or disabled;

a processing module configured for processing codes in the data block that corresponds to the inputted command line sub-parameter;

at least one storage device of the computer for storing the setting module, the searching module, the input/output module, and the processing module; and at least one processor of the computer for executing the setting module, the searching module, the input/output module, and the processing module.

2. The system as claimed in claim 1, wherein the command line sub-parameter of the parametric structure is corresponding to a data block of the data structure.

3. A method for enabling/disabling write-protection of a basic input/output system (BIOS) of a computer, the computer comprising a central I/O controller and a super I/O controller, the method comprising the steps of:

setting a parameter structure;

configuring a pointer of a header file and a data structure of the header file in a particular program segment of the BIOS codes;

configuring data blocks for the data structure in the particular program segment, the data blocks used to set a general purpose input/output (GPIO) pin of the central I/O controller and a GPIO pin of the super I/O controller in a high level state or a low level state, to enable/disable the write-protection of the BIOS;

searching the pointer of the header file, and locating the data blocks; and processing codes in a data block that is corresponding to a command line sub-parameter of the parameter structure.

4. The method as claimed in claim 3, further comprising the step of:

returning a message that indicates the write-protection of the BIOS is enabled or disabled.

5. The method as claimed in claim 3, wherein the command line sub-parameter of the parametric structure is corresponding to a data block of the data structure.

* * * * *

UNITED STATES PATENT AND TRADEMARK OFFICE
CERTIFICATE OF CORRECTION

PATENT NO. : 7,600,106 B2 Page 1 of 1
APPLICATION NO. : 11/309458
DATED : October 6, 2009
INVENTOR(S) : Fei-Zhou Wang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 598 days.

Signed and Sealed this

Fifth Day of October, 2010

David J. Kappos
*Director of the United States Patent and Trademark Office*